United States Patent [19]

Mader

[11] Patent Number: 5,445,423
[45] Date of Patent: Aug. 29, 1995

[54] BREAKAWAY LEVER CLUTCH

[75] Inventor: Gerald E. Mader, Indianapolis, Ind.

[73] Assignee: Von Duprin, Inc., Indianapolis, Ind.

[21] Appl. No.: 84,102

[22] Filed: Jul. 1, 1993

[51] Int. Cl.⁶ ............................................. E05B 3/00
[52] U.S. Cl. .................................. 292/336.3; 292/34; 292/336.5; 403/2
[58] Field of Search ............... 292/34, 46, 336.3, 348, 292/245, 140, 197, DIG. 62, 336.5, DIG. 27, DIG. 21, DIG. 52; 70/224, 380; 403/2, 33

[56] References Cited

U.S. PATENT DOCUMENTS

| | | | |
|---|---|---|---|
| 1,744,957 | 1/1930 | Fox | 292/348 |
| 2,138,856 | 12/1938 | Harp | 292/336.3 X |
| 3,990,277 | 11/1976 | Mullich | 292/34 X |
| 4,418,552 | 12/1983 | Nolin | 292/34 X |
| 4,427,223 | 1/1984 | Godec et al. | |
| 4,847,950 | 7/1989 | Coleman | |
| 4,920,773 | 5/1990 | Surko, Jr. | 70/224 |
| 4,934,800 | 6/1990 | Choi | 292/336.3 X |
| 5,024,472 | 6/1991 | Cohrs | |
| 5,205,596 | 4/1993 | Ralph | 292/336.3 |

Primary Examiner—Rodney M. Lindsey
Attorney, Agent, or Firm—Robert F. Palermo; A. James Richardson

[57] ABSTRACT

A door lever assembly for disengaging an unlocked latch of a lockable door latch assembly includes a lever handle rotatably connected to a trim housing and a cam operably connected to the lever handle. The cam is positioned to rotate in response to rotation of the lever handle, converting its rotational movement to linear movement of a movable slider positioned adjacent to the cam. A lift arm is operably connected to vertical rods of the door latch assembly and an over-ride spring is connected between the slider and the lift arm. The over-ride spring transmits motion of the slider to the lift arm to lift the lift arm and the connected vertical rods when the door latch assembly is in an unlocked position. The over-ride spring compresses in response to slider movement when the blocking slide is positioned to block movement of the lift arm when the door latch assembly is in its locked position, preventing damage to components of the door lever assembly.

20 Claims, 7 Drawing Sheets

BREAKAWAY LEVER CLUTCH

BACKGROUND OF THE INVENTION

The present invention relates to a door lever assembly that resists vandalism and breakage and more specifically to a door lever assembly having a breakaway door handle for operating a door latch.

Conventional door levers having a fixed lock position are subject to damage by vandals; or those seeking unauthorized entry into commercial or public buildings. A locked door lever extending outward in a substantially horizontal position can be impacted with hammers or other devices to break the lever or shatter lock components. In addition, it is sometimes possible to use the weight of a person seeking entry to downwardly force a door lever and break the lock mechanism. To partially overcome this problem, certain door levers are designed to have shear pins or other elements for designed failure that break and render the lever mechanism inoperable after application of undue force.

For example, a conventional door lever typically has a trim housing configured to accommodate a key cylinder lock above a rotatable lever handle that is operably connected to a door latch mechanism. The lever handle is permanently pinned to a shaft that extends inward to engage an eccentrically configured cam. The cam can be rotated to upwardly move a slider plate that is connected to a lift arm. Movement of the lift arm causes movement of vertically directed rods that are connected to retract a door latch. Locking this assembly simply requires rotation of the key cylinder to engage a blocking slide known as a trim lock tumbler that prevents movement of the lift arm, and consequently fixes the slider, cam, shaft, and door lever in a fixed and locked position.

However, with this type of assembly the door lever handle is fixed (in its locked position) to extend horizontally outward. To prevent permanent damage to the lock mechanism, a shear pin is provided to connect the cam and the shaft. Application of excessive torque forces to the lever handle causes failure of the shear pin, effectively disconnecting the lever and attached shaft from the remaining elements of the door lever assembly. Although this protects the remaining lock elements from further damage, it does require removal of the trim housing and replacement of the shear pin to restore lever function.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a novel breakaway lever assembly for disengaging an unlocked latch of a lockable door latch assembly which has an unlocked and a locked position, with vertical rods movable in the unlocked position to release a door latch, and a blocking slide movable to the locked position to prevent movement of the vertical rods and the connected door latch; the lever assembly has a lever handle rotatably connected to a trim housing, a cam operably connected to the lever handle and positioned to rotate in response to rotation of the lever handle. Upon rotation of the cam, a slider is vertically moved, and an over-ride spring, connected between the slider and a lift arm, transmits motion of the slider to the lift arm to lift the lift arm and the connected vertical rods when the door latch assembly is in its unlocked position; and compresses in response to slider movement when the blocking slide is positioned to block movement of the lift arm when the door latch assembly is in its locked position.

The foregoing and other aspects will become apparent from the following detailed description of the invention when considered in conjunction with the accompanying drawing figures.

DETAILED DESCRIPTION

Figure 1:
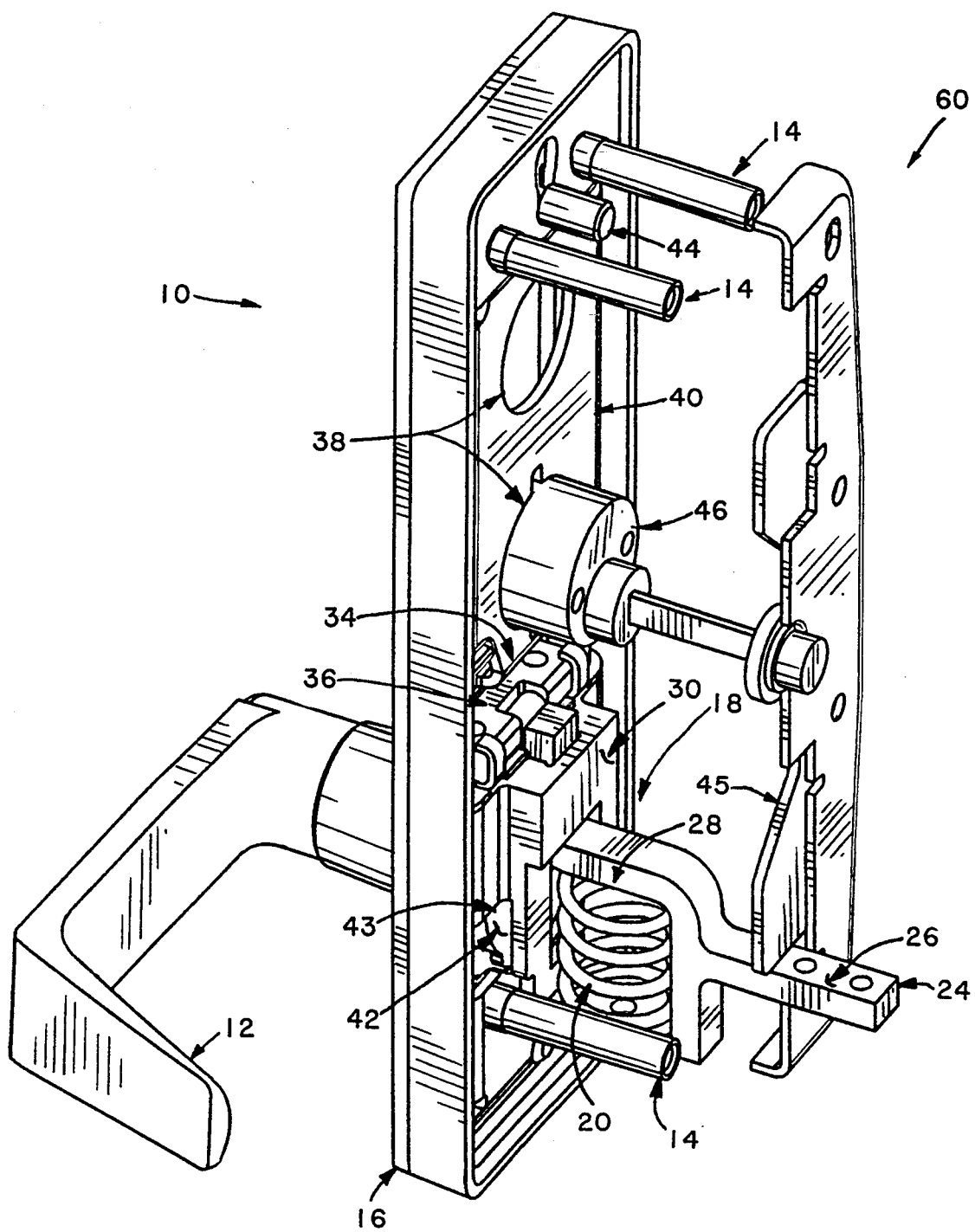
FIG. 1 is a perspective view of a backside of a door lever assembly in accordance with the present invention, showing an outwardly extending lift arm for engagement with a door latch assembly (not shown), an over-ride spring assembly positioned adjacent to the lift arm, and a door lever handle in its horizontally outward extending position.
Figure 7:
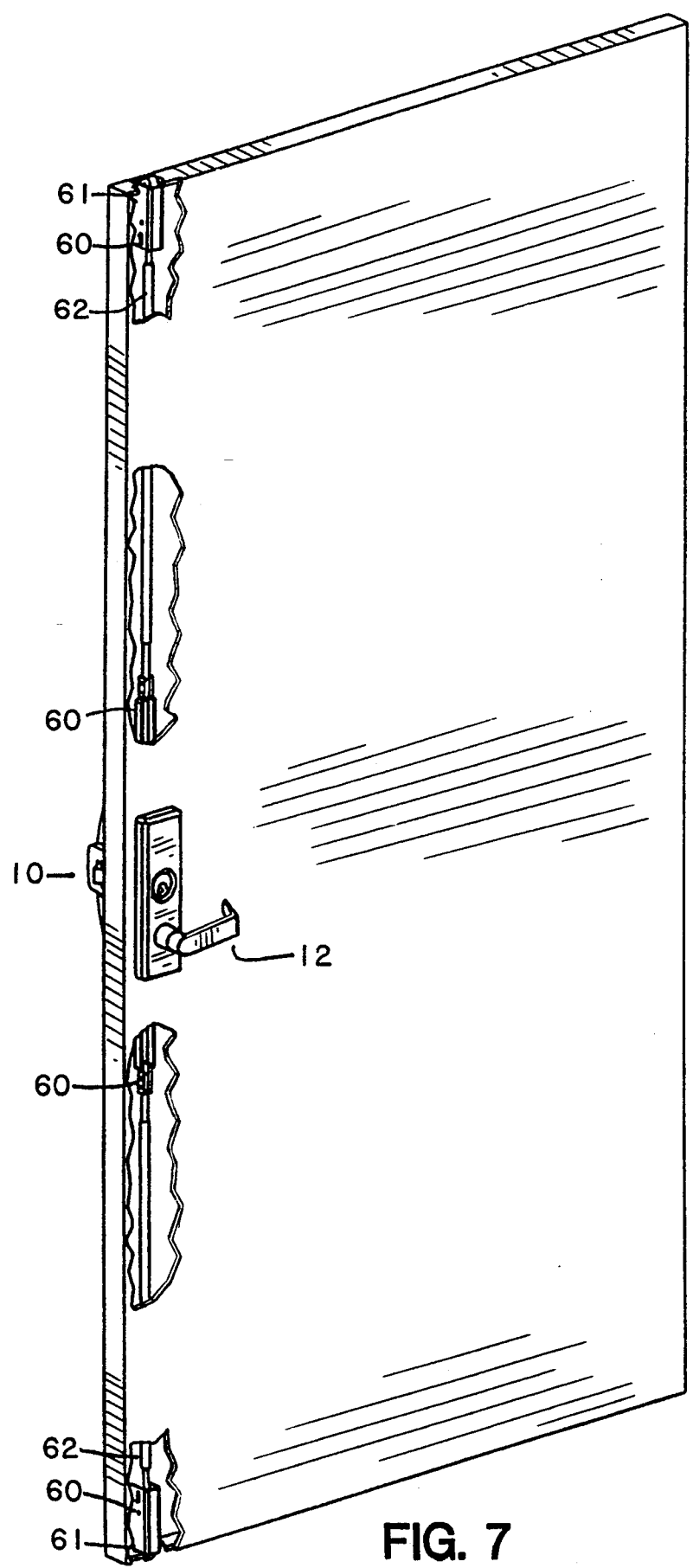
FIG. 7 is a perspective view of a door lever assembly accommodated in a latchable door, with the door partially broken away to indicate vertically extending rods in the door that are movable in response to rotation of the unlocked door lever assembly.

As illustrated in FIGS. 1 and 7, a door lever assembly 10 for use in single (as shown in FIG. 7) or double door applications includes a lever handle 12 and mounting studs 14 for a trim housing 16. Turning the lever handle 12 results in movement of a lift arm 24, which in turn engages and moves connected vertical rods that operate retraction or extension of a door latch. The lever handle 12 is of conventional design. The trim housing 16 can be attached to a door by engagement with mounting studs 14, which are typically threaded to allow easy screw attachment or disengagement. The trim housing 16 supports on its interior permanently attacked weld studs 44. The weld studs 44 retain a plate 40 that defines therethrough two door lock apertures 38. As best shown in FIG. 1, a mechanism for locking the door can be attached to extend through the trim housing 16 to engage a blocking slide 45 of a door latch assembly 60.

The door latch assembly includes vertically directed rods 62 movably connected to latches 61. The blocking slide 45 is moved upward or downward by rotation of a key cylinder 46 of the door lock mechanism.

When the door lock plate is positioned in its unlocked, upward position, movement of the lift arm 24 to retract the door latch 61 is not impeded. The lift arm 24 typically is constructed from a single integral piece of metal to have a flat lock engaging portion 26 and a flat spring engaging portion 28 joined by a curved intermediary portion. As shown in FIG. 1, the lock engaging portion 26 engages the door latch assembly for retraction of the door latch, and can be prevented from movement by contact with the blocking slide 45 when the blocking slide 45 is positioned in its locked position.

The spring engaging portion 28 of the lift arm is conformably attached to an over-ride assembly 18 that includes an over-ride spring 20. The over-ride spring 20 is typically configured to have a high spring constant, and under normal operating torque is essentially inelastic. In addition, a preload of approximately 70 pounds is commonly imparted to the spring to result in an initial lever torque of about 10 foot-pounds. However, when sufficiently high forces are exerted the preload force will be overcome and the spring 20 will begin to compress. As will be appreciated by those skilled in the art, the exact spring material and configuration can be varied, and it is even possible to use elastomeric materials in place of coiled springs as necessary.

Figure 4:
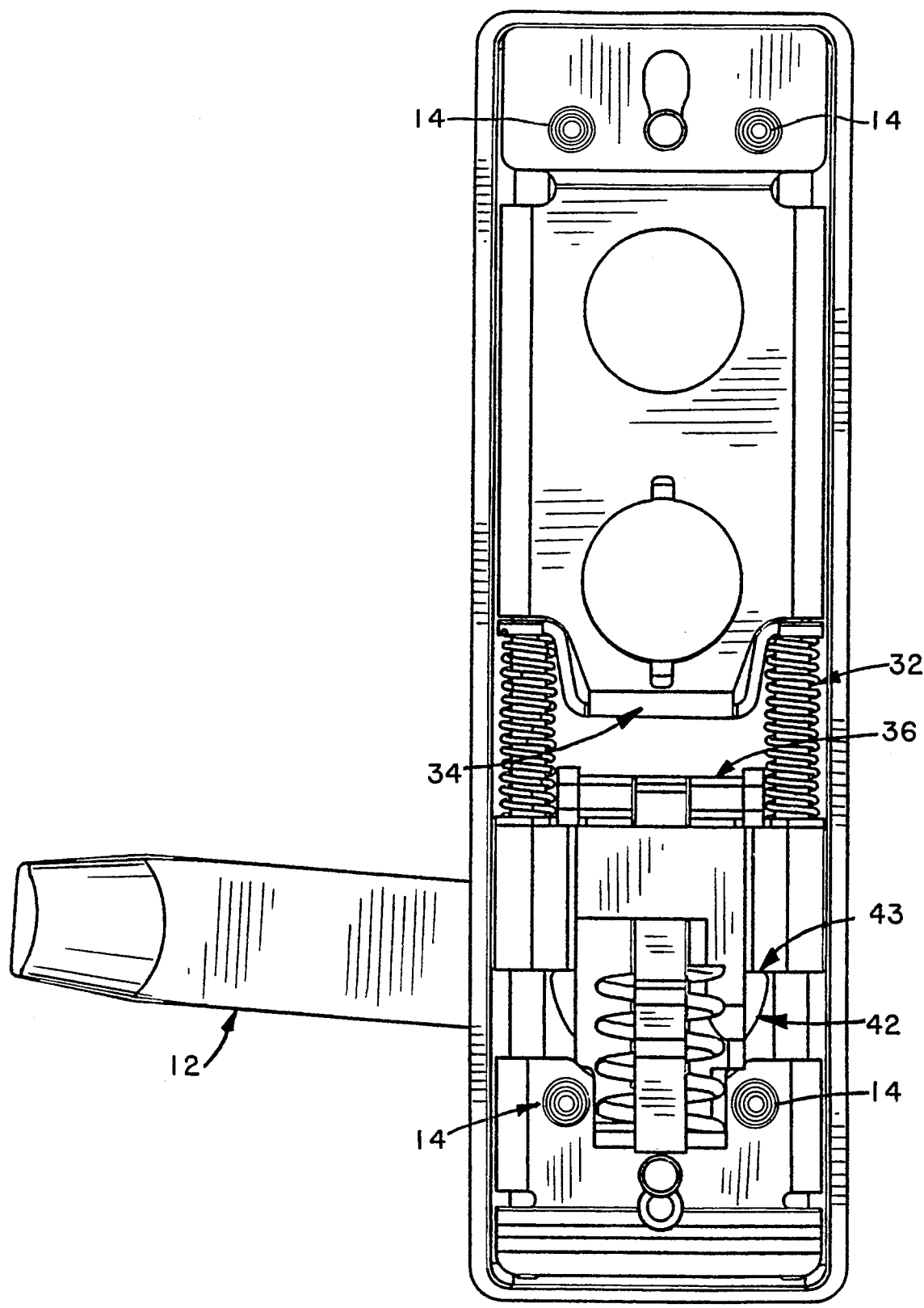
FIG. 4 is a rear view of the door lever assembly of FIG. 2, showing orientation of the cam and spring components.
Figure 5:
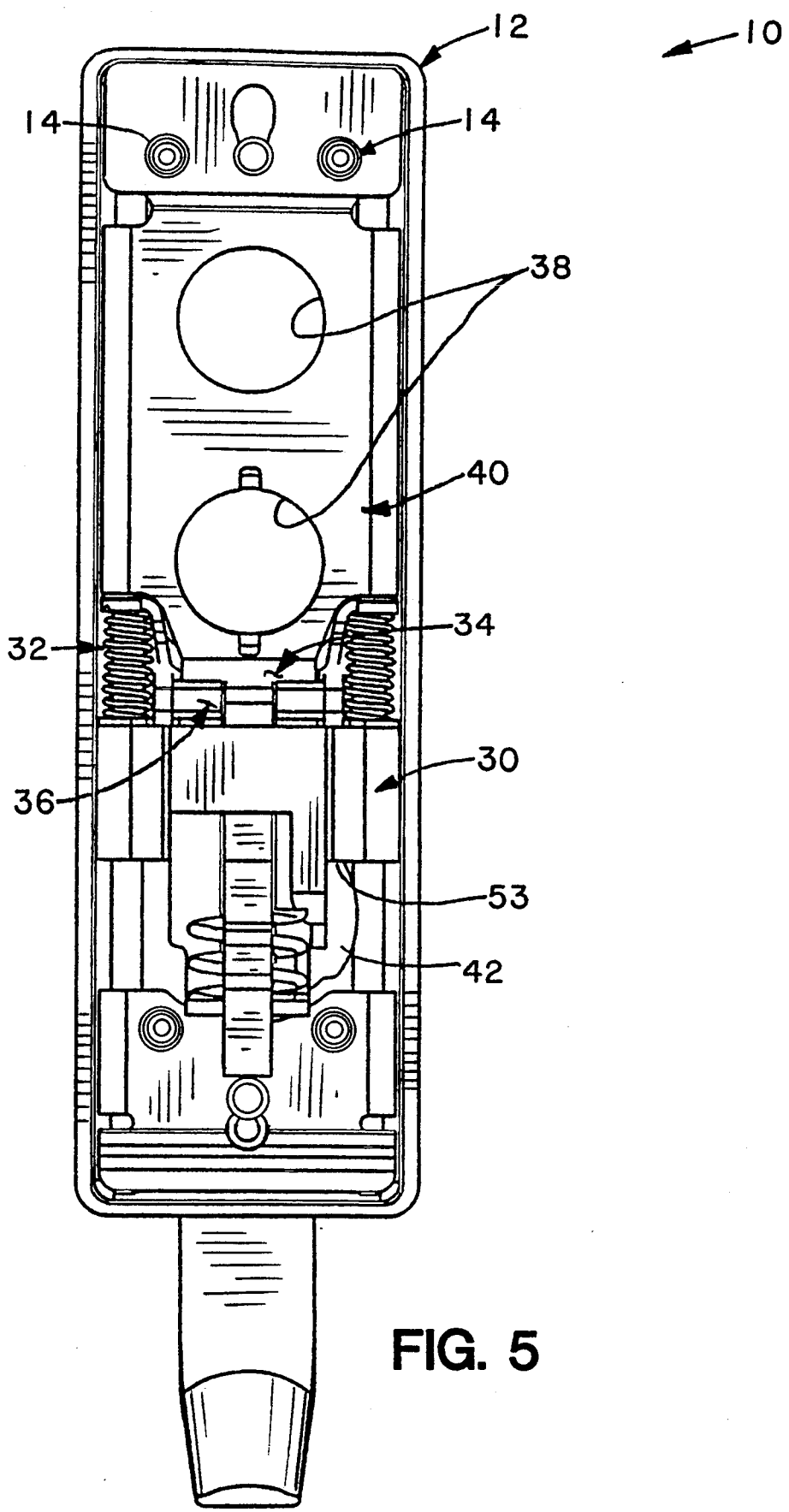
FIG. 5 is a rear view of the door lever assembly illustrated in FIG. 3, showing orientation of the cam and spring after rotation of the door lever handle when the lift arm is maintained in a locked position.

The spring engaging portion 28 of the lift arm 24 is also attached to a vertically movable slider 30. The slider 30 is a generally flat plate that is vertically movable with the trim housing 16. Rotation of an eccentrically configured cam 42 causes a cam wing 43 to upwardly push the slider 30, which in turn upwardly impels the lift arm 24. As best seen in FIGS. 1, 4 and 5, the slider 30 has an attached elastomer 36 for engagement witch a stop plate 34 defined by the lower edge of the plate 40. In addition, lift springs 32 are attached between the slider 30 and plate 40. The lift springs are biased to normally push the slider 30 downward, which in turn acts to rotate the cam 42 and return the lever to a horizontal position.

Figure 6:
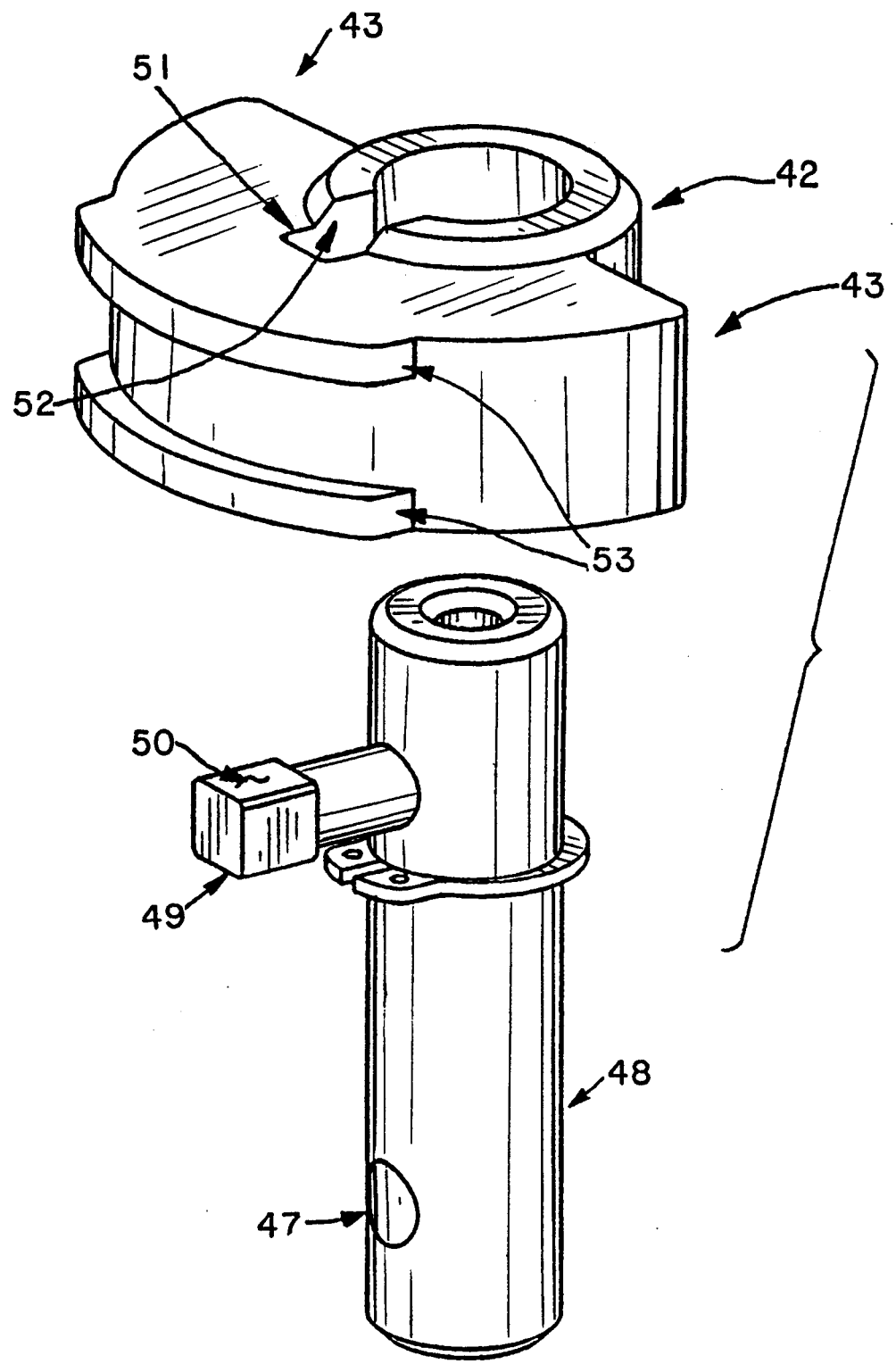
FIG. 6 is a perspective view of a shaft for connection to the door lever, with a shear pin for connection with an eccentric cam being indicated.

Manual rotation of the cam 42 is driven by rotation of the door lever handle 12. As illustrated in part in FIG. 6, the door lever handle 12 (not indicated in the Figure for clarity) can be connected by a pin (not shown) to a lever connection site 47 defined at one end of a shaft 48. At an opposite end of the shaft 48, a shear pin 49 having a plurality of flat edges 50 is attached. The shear pin 49 fits into a shear pin connection site 51 having matching flat edged walls 52 defined by the cam 42. As seen in FIG. 6, the shear pin 49 extends outward in one direction for engagement with the cam 42. As long as torque is maintained with predefined limits, rotation of the door lever handle 12 results in rotation of the shaft 48, and consequent rotation of the shear pin connected cam 42. If rotation of the cam 42 is prevented, as is the case when the door lever assembly is locked and a stop 53 on the cam 42 prevents further cam rotation, application of excessive torque to the door lever handle 12 results in breakage of the shear pin, disconnecting the lever handle 12 from the cam 42.

Figure 2:
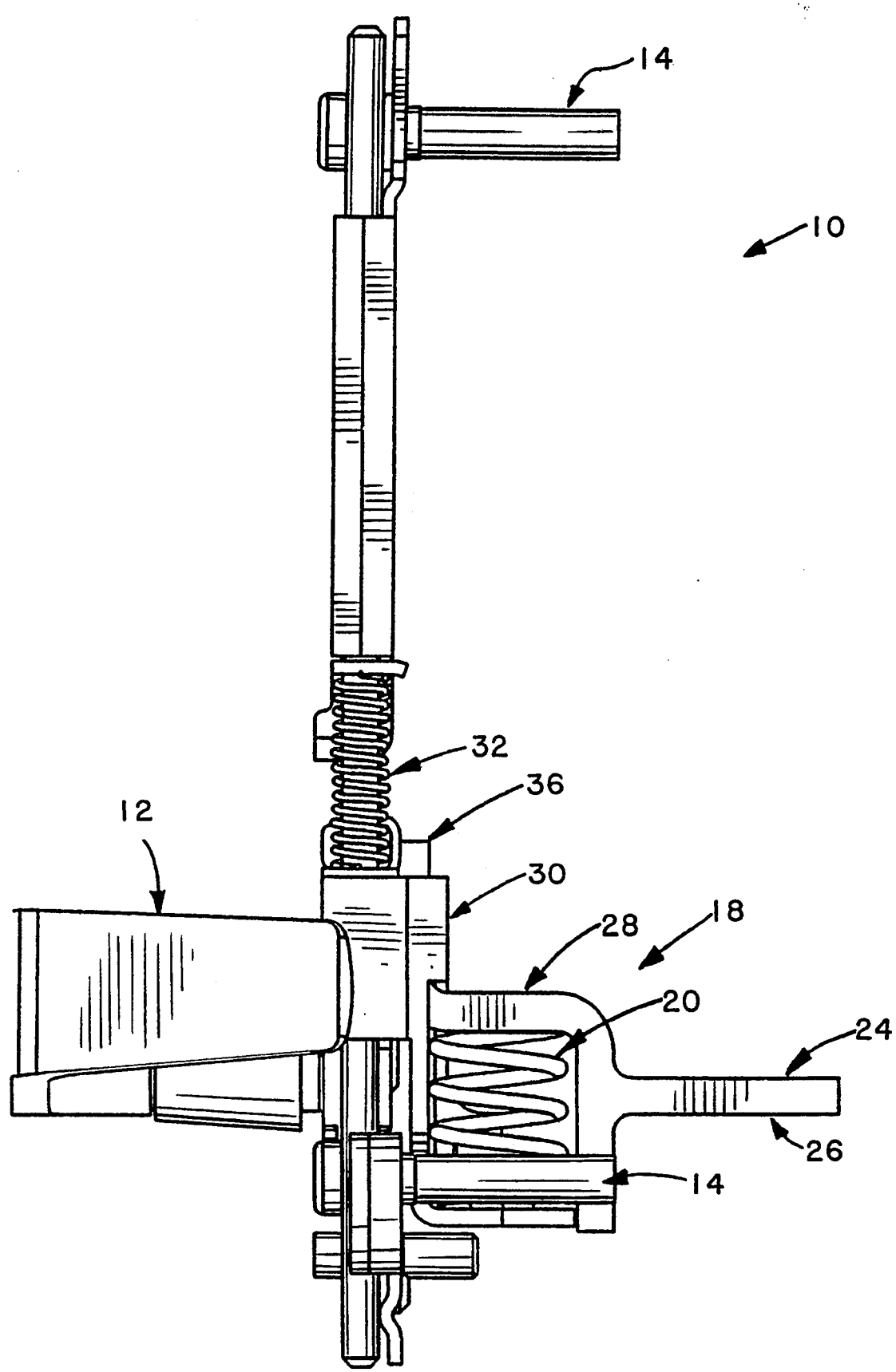
FIG. 2 is a side view of the door lever assembly illustrated in FIG. 1, showing the door lever handle in a horizontally extending position and the over-ride spring uncompressed, the trim housing being removed for clarity.
Figure 3:
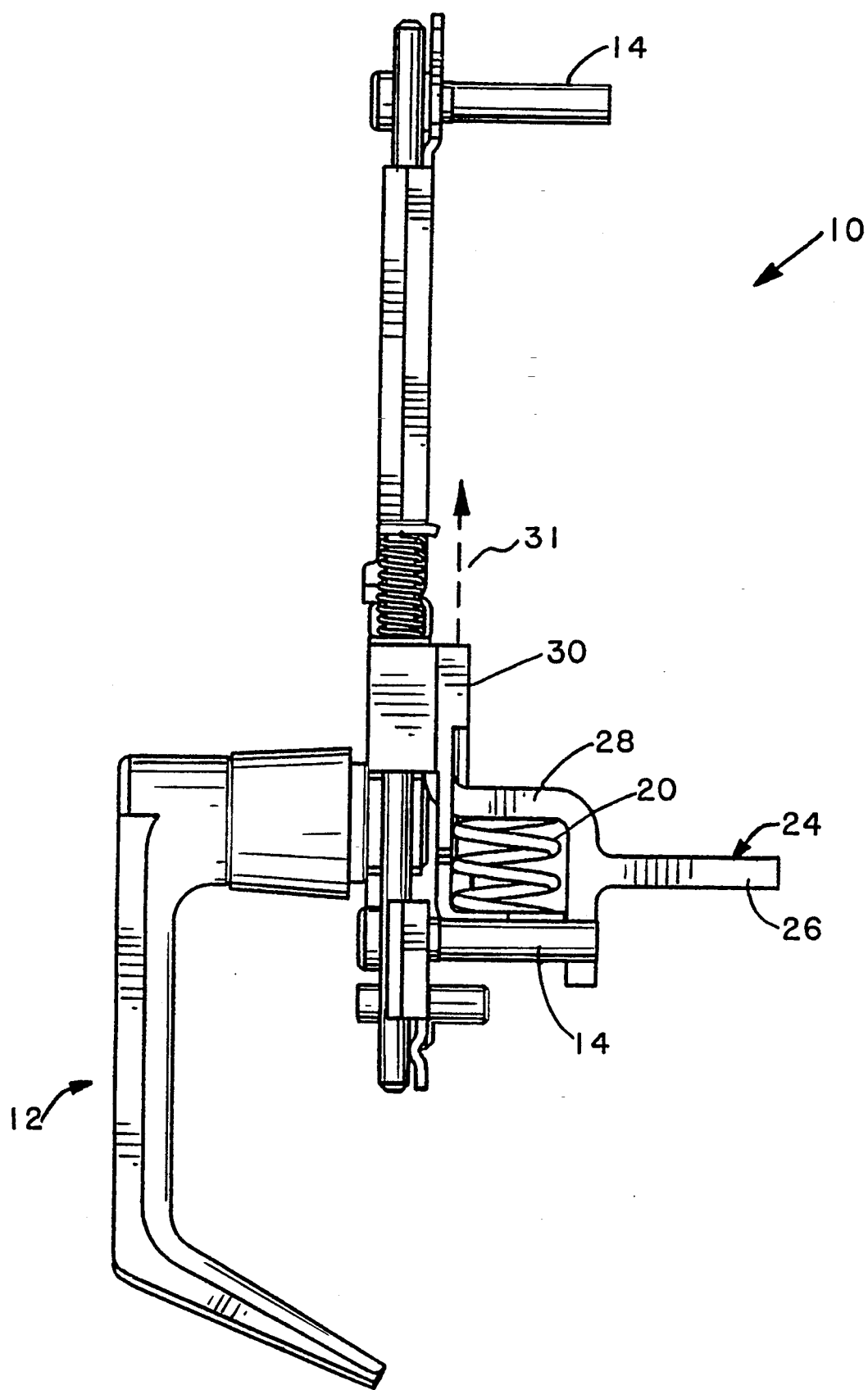
FIG. 3 is a side view of the door lever assembly illustrated in FIG. 2, with the door lever handle rotated and the lift arm remaining in a locked position, so that rotation of the door lever handle results in compression of the over-ride spring, the trim housing being removed for clarity.

In its unlocked position, operation of the door lever assembly 10 in accordance with the present invention is little different from presently available devices. As best seen in FIGS. 2 and 4, the bias of the lift springs 32 maintains the door lever handle 12 in a substantially horizontal position to allow easy grasping of the handle by a user desiring to open a door. To open the door, the handle 12 is rotated downward, consequently rotating the shaft 48 and shear pin 49 connected cam 42. As best seen in FIGS. 3 and 5, rotation of the eccentrically configured cam 42 is converted into upward, linearly directed movement 31 of the slider 30 as the wing 43 of the cam engages and impels the slider 30 upward against the biasing force exerted by the lift springs 32.

Movement of the slider 30 also causes movement of the connected lift arm 24. As the lift arm 24 is raised, connected vertical rods of the door latch assembly are also moved to release a door latch and allow opening of the door. During movement of the lift arm 24, the over-ride spring 20 is essentially uncompressed due to its high spring constant and the relatively low compression forces exerted. Rotation of the lever handle beyond about 50 to 55 degrees from horizontal, such as shown in the Figures, is impeded by interaction of the elastomer 36 attached to the slider and the contacting the stop plate 34. Further attempts to rotate the handle will cause the elastomer to compress, allowing the cam wing 43 to slip past the slider 30 so that it is no longer engaged. For embodiments of the invention used in double door applications, an optional stop 53 can be provided to engage and prevent additional rotation of the cam past 90 degrees downward from the initial horizontal lever position. For single door applications, the cam 42 can be rotated 360 degrees back to its original position.

Operation of the lever handle is altered when the blocking slide is moved downward into a locking position. As best seen in FIG. 1, the blocking slide prevents upward movement of the lift arm 24. Since movement of the lift arm 24 is prevented, movement of the connected slide, cam, shaft, and door lever handle is also inhibited. Someone trying to open the door would realize from the resistance to movement of the door lever handle that the door is locked.

However, if someone is trying to force the door by using their weight, pry bars, hammers, or other tools to drive the door lever handle downward, the preload force on the over-ride spring can be overcome and the door handle will rotate to a downwardly directed position. With the present device, the lift arm does not move upward. Instead, against increasingly greater resistance the cam 42 can be forced to rotate. As the cam rotates, the slide 30 moves upward, compressing the over-ride spring 20, but not causing movement of the lift arm. When the door lever handle is rotated to a downward position of about 50 to 55 degrees, the elastomer 36 engages the stop plate 34. In substantially the same manner as previously described for the unlocked condition, application of further torque force against the door lever handle merely causes disengagement of the cam 42 from its interaction with the slide 30, allowing the lever to travel to a vertically downward position such as seen in FIGS. 3 and 5.

Advantageously, the present invention allows the normal operation and use of a door lever assembly that is substantially identical to conventional door lever assemblies when normal forces are exerted. However, when excessive forces are exerted against the door lever handle, such as applied in attempts to force a door lock or vandalize, the present mechanism disengages when in the unlocked position to prevent damage to the door lever assembly. In the locked position, the novel door lever assembly absorbs blows (by the over-ride spring)

and then disengages to prevent damage. Because of the use of the over-ride spring and the elastomer/stop plate interaction, in single door applications there will be typically no need to rely on shear pin failure to prevent damage to the door lever assembly. For double door applications, shear pin failure may still be needed as a last resort should entry attempts persist, but as compared to conventional devices, the improved shear pin design and placement make shear pin failure both easier to rely upon and easier to replace.

What is claimed is:

1. A lever assembly for disengaging a door latch of a door latch assembly having an unlocked and a locked position, vertical rods which are removable to release a door latch when said door latch assembly is in an unlocked position, and a blocking slide movable to locked position to prevent movement of the vertical rods and the door latch connected thereto, the lever assembly comprising:
   a lever handle rotatably connected to a trim housing;
   a cam operably connected to the lever handle and positioned to rotate in response to rotation of the lever handle;
   a slider movable in response to rotation of the cam;
   a lift arm connected to the vertical rods of the door latch assembly; and
   an over-ride spring connected between the slider and the lift arm, with the over-ride spring transmitting motion of the slider to the lift arm to lift the lift arm and the connected vertical rods when the door latch assembly is in its unlocked position, and with the over-ride spring compressing in response to slider movement when the blocking slide is positioned to block movement of the lift arm when the door latch assembly is in its locked position.

2. The lever assembly of claim 1, further comprising a shaft attached between the lever handle and the cam, with a breakable shear pin attaching the shaft to the cam.

3. The lever assembly of claim 2, wherein the breakable shear pin has at least one flat side to engage a flat wall defined by the cam.

4. The lever assembly of claim 2, wherein the breakable shear pin extends outward from the shaft in only one direction to engage the cam.

5. The lever assembly of claim 1, further comprising a stop plate attached to the trim housing, and a compressible lift spring positioned between the stop plate and the slider for compression as the slider moves toward the stop plate and expansion to move the slider away from the stop plate and return the lever handle to an initial position upon release of the lever handle.

6. The lever assembly of claim 1, further comprising a stop plate attached to the trim housing, and an elastomer attached to the slider to engage the stop plate as the slider moves adjacent to the stop plate.

7. The lever assembly of claim 6, wherein the cam is configured to slip past the slider after engagement of the elastomer and the stop plate to permit circular rotation of the lever handle.

8. The lever assembly of claim 6, further comprising a stop attached to the trim housing adjacent to the cam, the stop being positioned to engage the cam and prevent further rotation of the lever handle after engagement of the elastomer and the stop plate.

9. The lever assembly of claim 1, wherein the lever handle in an initial position is directed horizontally, and wherein the cam disengages from moving contact with the slider when the lever handle is forced past a vertical position.

10. The lever assembly of claim 9, further comprising a stop plate attached to the trim housing, and an elastomer attached to the slider to engage the stop plate as the slider moves adjacent to the stop plate, and with the cam being configured to slip past the slider after engagement of the elastomer and the stop plate to permit circular rotation of the lever handle.

11. A lever assembly for a latchable door having a latch assembly positionable in both a locked and an unlocked position, the lever assembly comprising:
    a trim housing configured to accommodate a rotatable lever handle and a rotatable key cylinder;
    means for vertically moving a slider in response to rotation of the lever handle;
    a lift arm connected to the latch assembly; and
    a selectively compressible element connected between the slider and the lift arm, with the selectively compressible element biased to transmit motion of the slider to the lift arm to move the lift arm and the connected latch assembly when the latchable door is in its unlocked position, and with the selectively compressible element compressing in response to slider movement when movement of the lift arm is blocked when the latchable door is in its locked position.

12. The lever assembly of claim 11, wherein the means for vertically moving the slider comprise an eccentric configured cam, with the cam attached to a shaft extending between the lever handle and the cam, and with a breakable shear pin having at least one flat side attaching the shaft to the cam so that excessive torque will cause failure of the shear pin and disengage the cam and the shaft.

13. The lever assembly of claim 12, wherein the breakable shear pin extends outward from the shaft in only one direction to engage the cam.

14. The lever assembly of claim 12, further comprising a stop plate attached to the trim housing, and a compressible lift spring positioned between the stop plate and the slider for compression as the slider is urged by rotation of the cam toward the stop plate and expansion to move the slider away from the stop plate, and urge rotation of the cam and the lever handle to a horizontal position.

15. The lever assembly of claim 11, further comprising a stop plate attached to the trim housing, and an elastomer attached to the slider to engage the stop plate as the slider moves adjacent to the stop plate.

16. A double door lever assembly for disengaging a door latch of a door latch assembly having an unlocked and a locked position, vertical rods which are movable to release a door latch when said door latch assembly is in an unlocked position, and a blocking slide movable to a locked position to prevent movement of the vertical rods and the door latch connected thereto, the lever assembly comprising:
    a lever handle rotatably connected to a trim housing;
    a cam operably connected to the lever handle and positioned to rotate in response to rotation of the lever handle;
    a stop attached to the trim housing and positioned to engage and prevent rotation of the cam through a predetermined position;
    a slider movable in response to rotation of the cam;
    a lift arm connected to the vertical rods of the door latch assembly; and an over-ride spring connected between the slider and the lift arm, with the over-ride spring transmitting motion of the slider to the lift arm to lift the lift arm and the connected vertical rods when the door latch assembly is in its unlocked position, and with the over-ride spring compressing in response to slider movement when the blocking slide is positioned to block movement of the lift arm when the door latch assembly is in its locked position.

17. The lever assembly of claim 16, further comprising a shaft attached between the lever handle and the cam, with a breakable shear pin attaching the shaft to the cam.

18. The lever assembly of claim 17, wherein the breakable shear pin has at least one flat side to engage a flat wall defined by the cam.

19. A door lever assembly for disengaging an unlocked latch of a lockable door latch assembly, the door latch assembly having an unlocked and a locked position, the lever assembly comprising:

a lever handle operably connected to the latch of the lockable door latch assembly;

a cam positioned to rotate in response to rotation of the lever handle; and a shaft extending in fixed attachment between the lever handle and the cam with a breakable shear pin attaching the shaft to the cam, said breakable shear pin being configured to break upon application of a predetermined amount of torque, and with the breakable shear pin having at least one flat side to engage a flat wall defined by the cam to prevent lever handle droop.

20. The door lever assembly of claim 19, further comprising:

a slider movable in response to rotation of the cam;

a lift arm connected to promote movement of the latch of the lockable door latch assembly; and an over-ride spring connected between the slider and the lift arm, with the over-ride spring transmitting motion of the slider to the lift arm to lift the lift arm and retract the door latch connected thereto when the door latch assembly is in its unlocked position, and with the over-ride spring compressing in response to slider movement when movement of the lift arm is blocked when the door latch assembly is in its locked position.

* * * * *